United States Patent
Kawai et al.

(10) Patent No.: US 6,904,543 B2
(45) Date of Patent: Jun. 7, 2005

(54) ELECTRONIC CONTROL HAVING FLOATING-POINT DATA CHECK FUNCTION

(75) Inventors: Mitsuhiro Kawai, Kariya (JP); Masato Yano, Okazaki (JP); Takatoshi Sugimura, Anjo (JP)

(73) Assignee: Denso Corporation, Kariya (JP)

( * ) Notice: Subject to any disclaimer, the term of this patent is extended or adjusted under 35 U.S.C. 154(b) by 735 days.

(21) Appl. No.: 09/739,335

(22) Filed: Dec. 19, 2000

(65) Prior Publication Data

US 2001/0005808 A1 Jun. 28, 2001

(30) Foreign Application Priority Data

Dec. 24, 1999 (JP) ............................................. 11-366741
Apr. 3, 2000 (JP) ....................................... 2000-101028

(51) Int. Cl.[7] ............................................. G06F 11/00
(52) U.S. Cl. ............................. 714/32; 714/51; 701/36; 701/114; 701/101; 708/495
(58) Field of Search ......................... 712/222; 708/170, 708/495; 701/36, 58, 114, 101, 102; 714/32, 34, 51, 55, 13, 25

(56) References Cited

U.S. PATENT DOCUMENTS

| 5,272,659 | A | * | 12/1993 | Starr ........................... 708/552 |
| 5,339,266 | A | * | 8/1994 | Hinds et al. ................. 708/495 |
| 5,341,320 | A | * | 8/1994 | Trissel et al. ................ 708/498 |
| 5,583,989 | A | * | 12/1996 | Matsui et al. .................. 703/8 |
| 5,596,733 | A |   | 1/1997 | Worley, Jr. et al. ......... 712/224 |
| 5,631,831 | A | * | 5/1997 | Bird et al. ..................... 701/29 |
| 5,931,943 | A | * | 8/1999 | Orup ........................... 712/222 |
| 6,199,007 | B1 | * | 3/2001 | Zavarehi et al. ............ 701/111 |
| 6,654,669 | B2 | * | 11/2003 | Eisenmann et al. ............ 701/1 |
| 6,675,292 | B2 | * | 1/2004 | Prabhu et al. ............... 712/244 |
| 2002/0133691 | A1 | * | 9/2002 | Elliott et al. ................. 712/222 |
| 2003/0093654 | A1 | * | 5/2003 | Harris .......................... 712/220 |
| 2003/0135322 | A1 | * | 7/2003 | Koto et al. .................. 701/114 |

FOREIGN PATENT DOCUMENTS

| JP | 60-27973 | 2/1985 |
| JP | 9-258959 | 10/1997 |

* cited by examiner

*Primary Examiner*—Bryce P. Bonzo
*Assistant Examiner*—Christopher McCarthy
(74) *Attorney, Agent, or Firm*—Nixon & Vanderhye P.C.

(57) ABSTRACT

An engine control ECU includes a microcomputer, which includes CPU, RAM, ROM, FPU and I/O. The FPU performs floating-point calculations and the CPU carries out operations other than the floating-point calculations. The CPU checks whether non-numeric exists, and performs backup processing when the non-numeric is found. In the backup processing, the RAM data is initialized by writing default values harmless to control as the RAM data. In addition to or alternative to the initialization, the CPU disables a floating-point calculation of the FPU. Without using the FPU, the CPU performs engine control operations by using integer data instead of floating-point data.

39 Claims, 14 Drawing Sheets

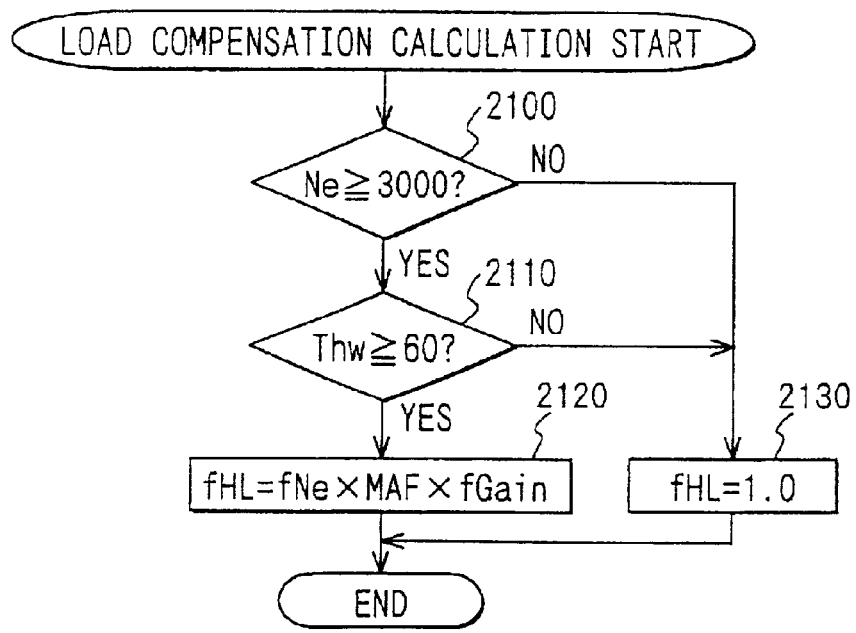
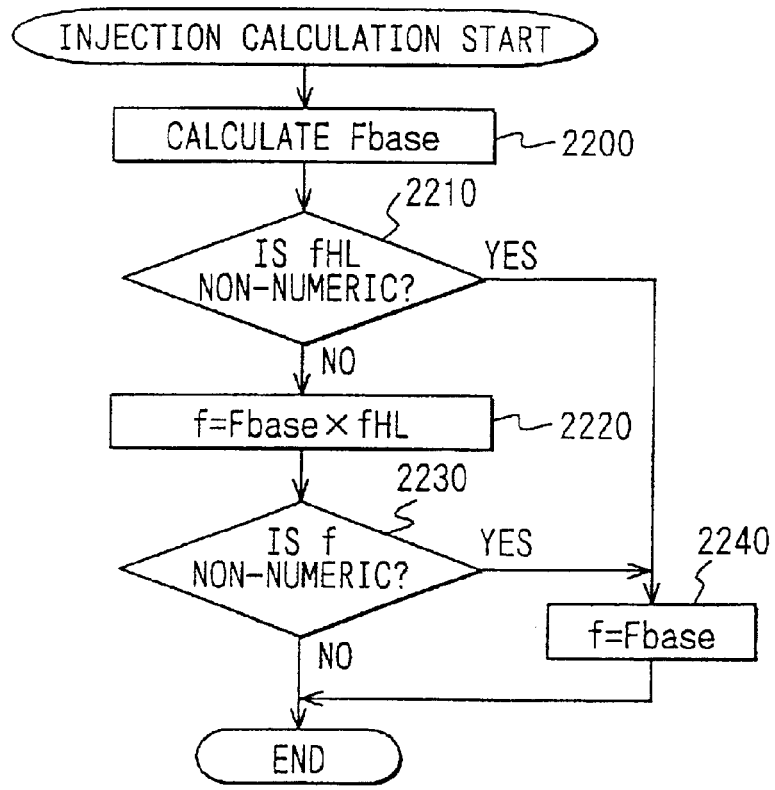

| EXPONENT | MANTISSA | MEANING OF NUMERICAL VALUE |
|---|---|---|
| 255 | OTHER THAN 0 | NON-NUMERIC |
| | 0 | POSITIVE OR NEGATIVE INFINITE NUMBERS |
| 254~1 | – | NORMALIZED NUMBERS |
| 0 | OTHER THAN 0 | DENORMALIZED NUMBERS |
| | 0 | POSITIVE OR NEGATIVE 0 |

ELECTRONIC CONTROL HAVING FLOATING-POINT DATA CHECK FUNCTION

CROSS REFERENCE TO RELATED APPLICATION

This application is based on and incorporates herein by reference Japanese Patent Applications No. 11-366741 filed on Dec. 24, 1999 and No. 2000-101028 filed on Apr. 3, 2000.

BACKGROUND OF THE INVENTION

The present invention relates to an electronic control having a floating-point data check function.

Electronic control units (ECU) used for a vehicle engine control or the like performs various operations such as calculations using fixed-point data. A floating-point processor (FPU) is recently used to enable calculations using floating-point data. Floating-point data yields calculation results with higher accuracy than fixed-point data.

Floating-point data is configured in compliance with the IEEE 754 standard. The floating-point data, as shown in FIG. 17A, has a one-bit sign part, an eight-bit exponent part, and a 23-bit mantissa part. Four-byte floating-point data (single-precision storage format) having a mantissa part of 23 bits has a resolution of seven digits (0.0000001).

FIG. 17B shows a bit pattern in single-precision storage format. A floating-point data is distinguished or divided into normalized numbers (values), denormalized numbers, infinite numbers, zero, and Not a Number (NaN, that is, non-numeric) by combinations of the exponent part and the mantissa part. Numbers other than non-numeric denote numeric values and non-numeric denotes that the numbers are not numeric. For example, non-numeric is used to indicate calculation results that cannot be represented as numeric values, such as 0/0, +∞ −∞.

The floating-point data has a data format of non-numeric. Once non-numeric is generated within the electronic control unit, it may propagate within the unit. Furthermore, all the results of, e.g., arithmetic calculations including non-numeric is non-numeric and become invalid. For example, comparisons about whether non-numeric is equal to or greater than or smaller than 1 produce a false result in either case. Therefore, the accuracy of calculation result (output value) cannot be guaranteed entirely, when non-numeric occurs within the electronic control unit.

Non-numeric may be generated in engine control primarily under two conditions. First, during calculation of the electronic control unit or battery backup, a RAM value of the floating-point type may change due to noise and the RAM value itself may change to non-numeric. For example, a floating-point RAM value may change to FFFFFFFFh (all one bits) due to noise. Second, arguments used in floating-point calculations may change due to noise or for other reasons, and non-numeric may be generated secondarily as a result of a calculation such as 0/0.

Specifically, in the case of fuel injection control, a fuel injection amount f is calculated as $f=Fbase \times fHL$, with Fbase being a basic fuel injection amount calculated as integer data and fHL being a load compensation value calculated as floating-point data. In this calculation, if the load compensation value fHL is non-numeric, the value of a fuel injection amount f resulting from the calculation also becomes non-numeric, making normal fuel injection impossible.

SUMMARY OF THE INVENTION

It is therefore an object of the present invention, to provide an electronic control unit which is capable of preventing control failures caused by non-numeric.

According to the present invention, it is checked whether floating-point data is non-numeric. When it is determined that it is non-numeric, backup processing is performed instead of calculating a control value such as a fuel injection amount or ignition timing by using floating-point data. The backup processing includes, for instance, initialization of data stored in a memory. By initializing the memory data in which the non-numeric exists, the non-numeric is eliminated so that, in a variety of control calculations by the microcomputer, various troubles attributed to the existence of data including non-numeric can be avoided.

BRIEF DESCRIPTION OF THE DRAWINGS

The above and other objects, features and advantages of the present invention will become more apparent from the following detailed description made with reference to the accompanying drawings. In the drawings:

FIG. 9 is a flow diagram showing a load compensation value calculation routine executed in the second embodiment;

FIG. 10 is a flow diagram showing a fuel injection amount calculation routine executed in the second embodiment;

DETAILED DESCRIPTION OF THE PREFERRED EMBODIMENT

The present invention will be described in detail with reference to various embodiments which are directed to an engine control system.

First Embodiment

Figure 1:
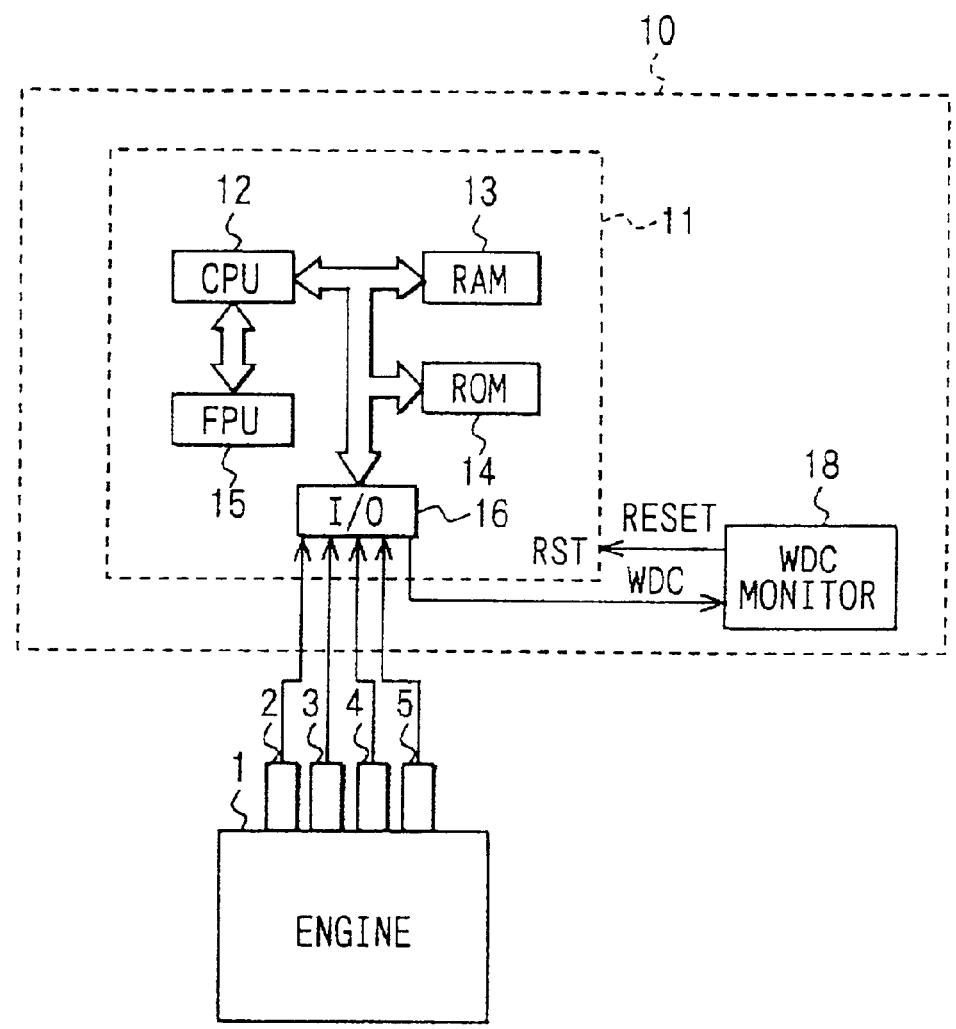
FIG. 1 is a block diagram showing an engine control system using an electronic control unit according to a first embodiment of the present invention.

Referring first to FIG. 1, an in-vehicle engine 1 is configured as, e.g., a multi-cylinder internal combustion engine of the gasoline injection type. An electronic control unit (ECU) 10 includes a microcomputer 11, which includes CPU 12, RAM 13, ROM 14, FPU (floating-point calculation unit) 15, and I/O (input/output unit) 16. The FPU 15 performs floating-point calculations and the CPU 12 carries out operations other than the floating-point calculations. The I/O 16 includes a known A/D converter. The RAM 13 is a storage device holding storage contents with electric power supplied from a built-in battery (not shown) even when an ignition switch is off. In this embodiment, the RAM 13 is thus backed-up by the battery to be used as a non-volatile memory (backup RAM). An EEPROM, flash memory, and the like may also be used as nonvolatile memories.

The ECU 10 includes a WDC (watchdog clear) monitoring circuit 18 as a watchdog circuit. The WDC monitoring circuit 18 monitors a WDC signal periodically produced from the microcomputer 11, and outputs a reset signal to the microcomputer 11 each time the periodicity of the WDC signal is lost due to, for instance, a break of the signal. The watchdog circuit may also be incorporated within the microcomputer 11.

Figure 2:
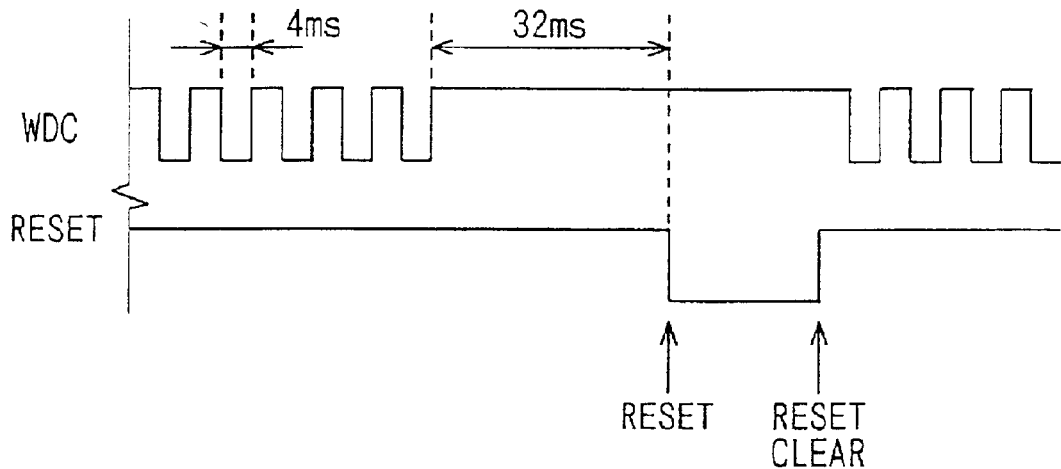
FIG. 2 is a time chart showing a WDC signal and a reset signal generated in the first embodiment.

For example, as shown in FIG. 2, the WDC signal is produced as a signal that is inverted from High to Low or from Low to High in a cycle of 4 ms. If the inversion edge is not detected for a predetermined period of time (for instance, 32 ms), the WDC monitoring circuit 18 drives the reset signal into Low. Thereafter, if the reset signal is turned off or cleared, the WDC signal inverted in a cycle of 4 ms is inputted again to the WDC monitoring circuit 18.

Various information indicative of engine operation states is inputted to the ECU 10 from sensors 2 to 5 attached to the engine 1. The sensors 2 to 5 comprise, e.g., an air flow meter or intake pressure sensor for detecting the amount of intake air Q or intake pressure MAF, an engine speed sensor for detecting an engine speed Ne, a water temperature sensor for detecting a coolant temperature Thw, a throttle sensor for detecting a throttle opening angle, an A/F sensor for detecting an air-fuel ratio from oxygen concentration in exhausted gas, and the like. According to the inputted sensor signals, the ECU 10 carries out the control of fuel injection and spark ignition by an injector and igniter (not shown).

Figures 17A, 17B:
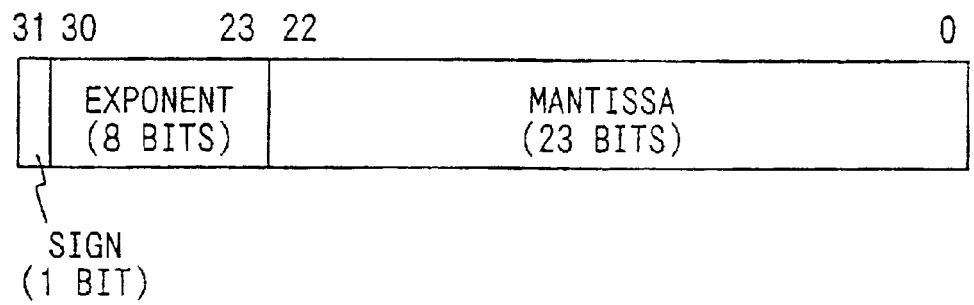
FIGS. 17A and 17B are diagrams showing configurations of floating-point data.

Floating-point data manipulated by the FPU 15 is configured in compliance with, e.g., the IEEE 754 standard. The floating-point data has a data format shown in FIG. 17A in the case of single-precision storage format. As shown in FIG. 17B, the floating-point data is distinguished into normalized numbers, denormalized numbers, infinite numbers, zeros, and non-numeric by combinations of the exponent part and the mantissa part.

Figure 3:
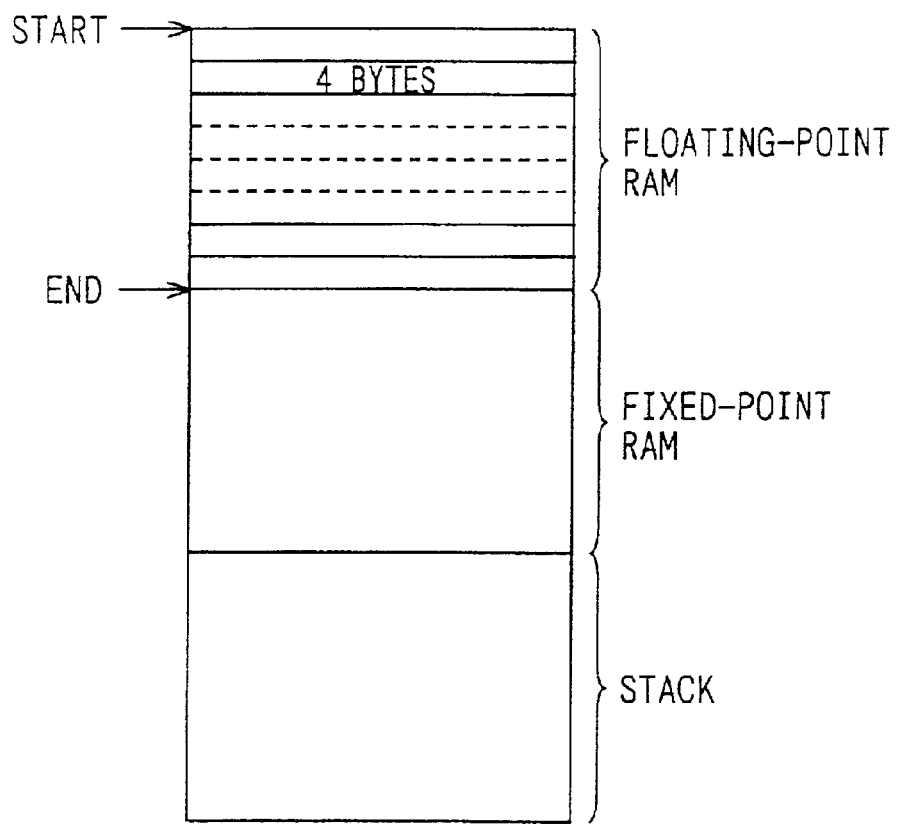
FIG. 3 is a diagram showing a configuration of RAM in the first embodiment.

FIG. 3 shows an example of the configuration of the RAM 13. The RAM 13 is divided into a floating-point RAM area, a fixed-point RAM area, and a stack area. The floating-point RAM area, which is divided in units of four bytes, is provided with START at its start address and with END at its end address. In this case, the floating-point RAM area is preferably allocated in a block, separately from the fixed-point RAM area and the stack area.

In this embodiment, when floating-point data stored in the RAM 13 turns into non-numeric because of noise or for other reasons before the ECU 10 is turned on to operate, or the floating-point data turns into non-numeric when the ECU 10 is busy, the CPU 12 detects it and initialize data to eliminate the non-numeric as one mode of backup processing. Various constants and RAM data defined in software routines are subjected to non-numeric checking operation of the CPU 12 as shown in FIG. 4 to FIG. 7.

Figure 4:
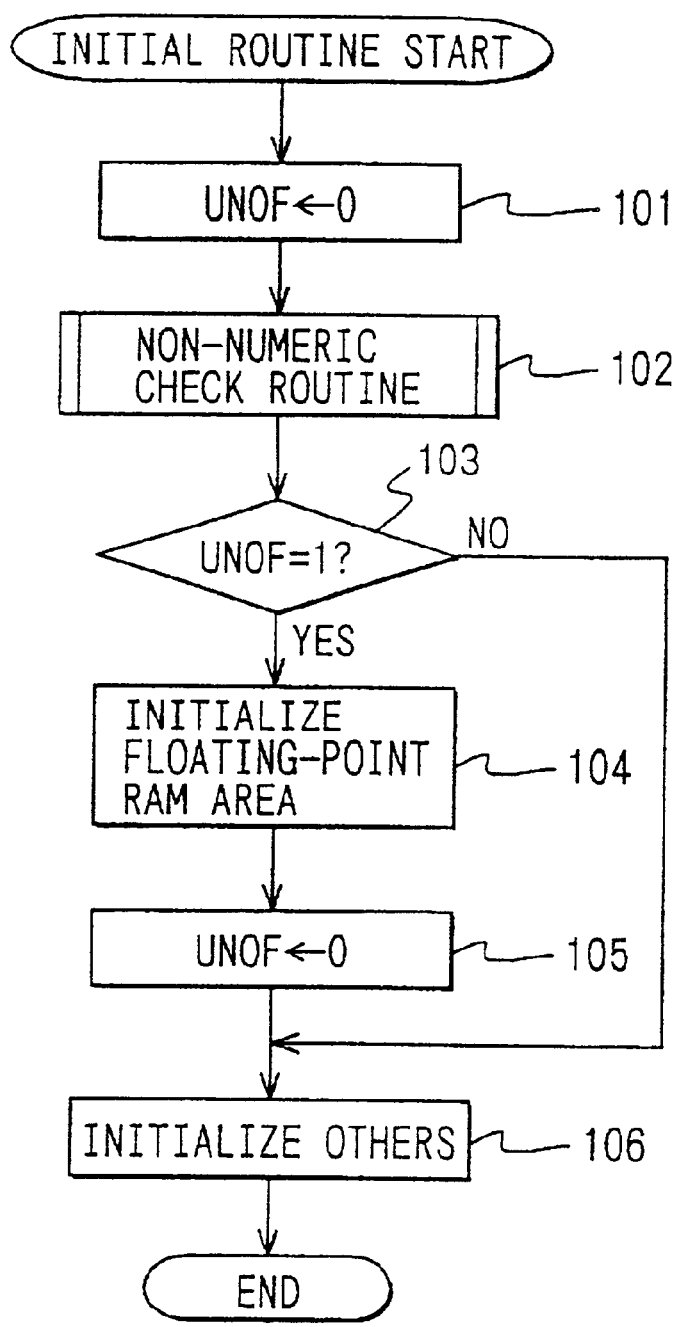
FIG. 4 is a flow diagram showing an initial routine executed in the first embodiment.

First, the procedure for checking for non-numeric immediately after the ECU 10 is switched on will be described according to the flow diagram of FIG. 4.

At step 101, non-numeric occurrence flag indicative of the generation or existence of non-numeric is set to 0. Next, at step 102, non-numeric check routine is called. The non-numeric check routine checks whether non-numeric exists in the floating-point RAM area, as will be described in detail in FIG. 5.

At the next step 103, it is checked whether the non-numeric occurrence flag (UNOF) is 0. If it is 0 because there is no non-numeric, the procedure proceeds to step 106. At step 106, after other initialization processing is performed, this processing terminates.

If non-numeric exists anywhere in the floating-point RAM area, since the non-numeric flag UNOF is set to 1, the procedure proceeds to step 104, where the floating-point RAM area is initialized. That is, default values ineffective for control are written to the floating-point RAM area to erase the non-numeric. Since this initialization processing eliminates or purges non-numeric, the non-numeric occurrence flag UNOF is set to 0 at step 105. At the next step 106, other initialization processing is performed and then this routine terminates.

Next, referring to the flow diagram of FIG. 5, the non-numeric check routine will be described in detail. This routine checks whether non-numeric exists by checking whether combinations of the exponent part (bits 30 to 23) with all ones (1s) and the mantissa part (bits 22 to 0) with not all zeros (0s) exist in the individual areas from the start address START to the end address END of the floating-point RAM.

More specifically, while modifying a variable R1 in units of four bytes from the start value START to the end value END to set addresses, loop processing that follows is performed. At this time, at step 201, the content of an address indicated by the variable R1 is captured as an R0 value. At step 202, whether bits 30 to 23 of the R0 value are "11111111" is checked. At step 203, whether bits 22 to 0 of the R0 value are all zeros is checked.

If step 202 results in NO, or both the steps 202 and 203 result in YES, floating-point data at the particular address is not non-numeric, and the routine proceeds to the address of the next floating-point data. If the step 202 results in YES and the step 203 results in NO, the routine determines that non-numeric exists in the floating-point RAM area, sets the non-numeric occurrence flag to 1 at step 204, and terminates the routine.

Figure 6:
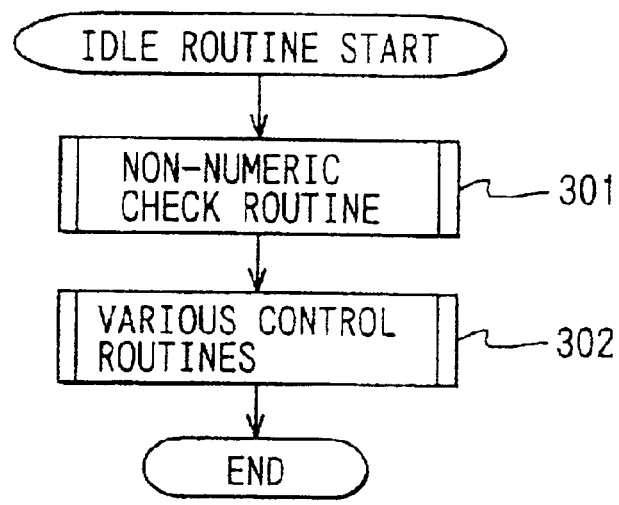
FIG. 6 is a flow diagram showing an idle routine executed in the first embodiment.

On the other hand, during normal calculation of the ECU 10, the existence of non-numeric is checked in an idle routine shown in FIG. 6. The idle routine is executed at idle time in various control calculations performed at a time cycle or at rotation signal synchronization. This routine is executed in a task having the lowest priority, of various processing tasks usually executed by the ECU 10.

Figure 5:
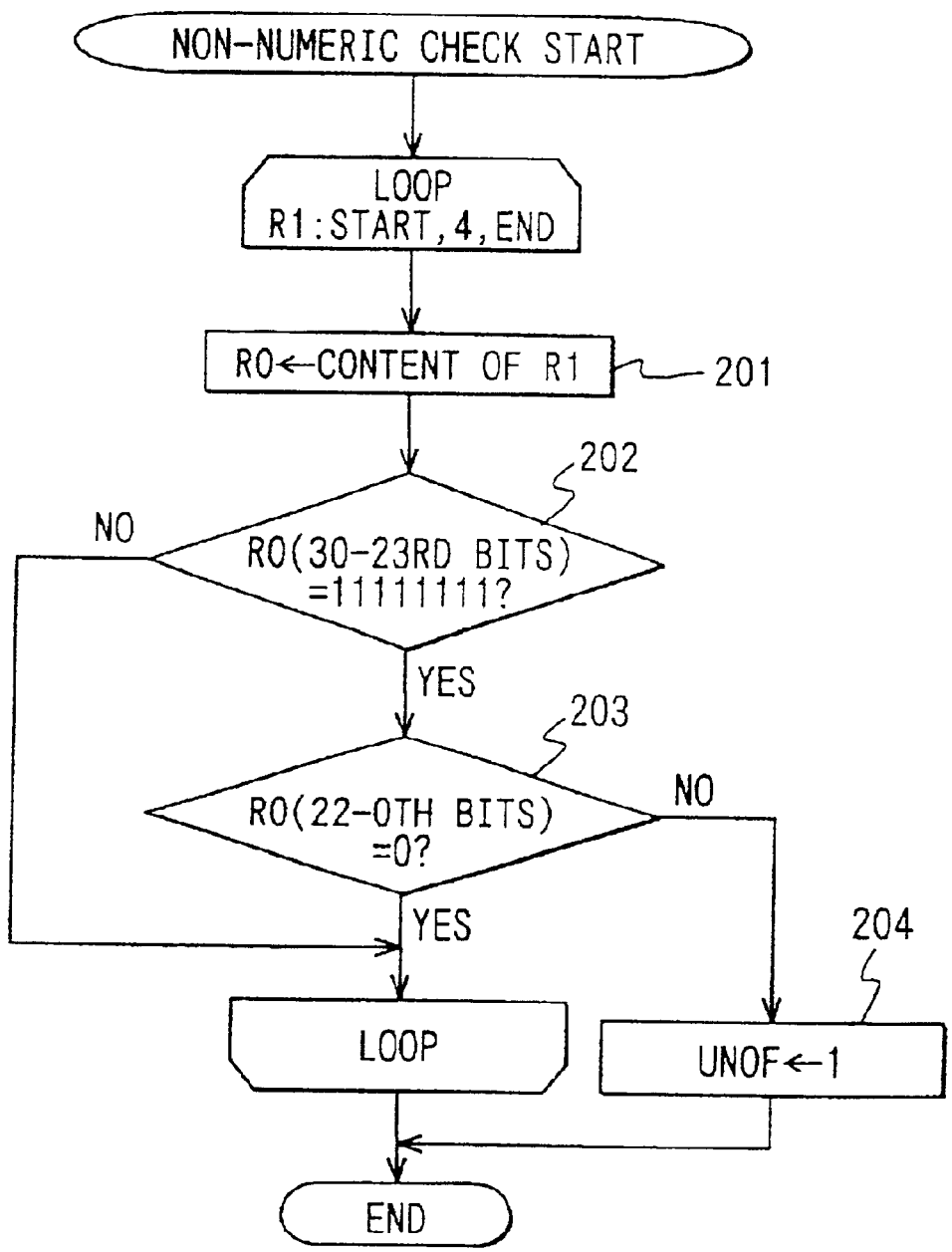
FIG. 5 is a flow diagram showing non-numeric check routine executed in the first embodiment.

At step 301 of FIG. 6, the non-numeric check routine of FIG. 5 is called to operate on the non-numeric occurrence flag UNOF, depending on the existence of non-numeric. At the next step 302, various control calculations such as check sum on the ROM 14 and verification of registers within the microcomputer 11 are performed.

Figure 7:
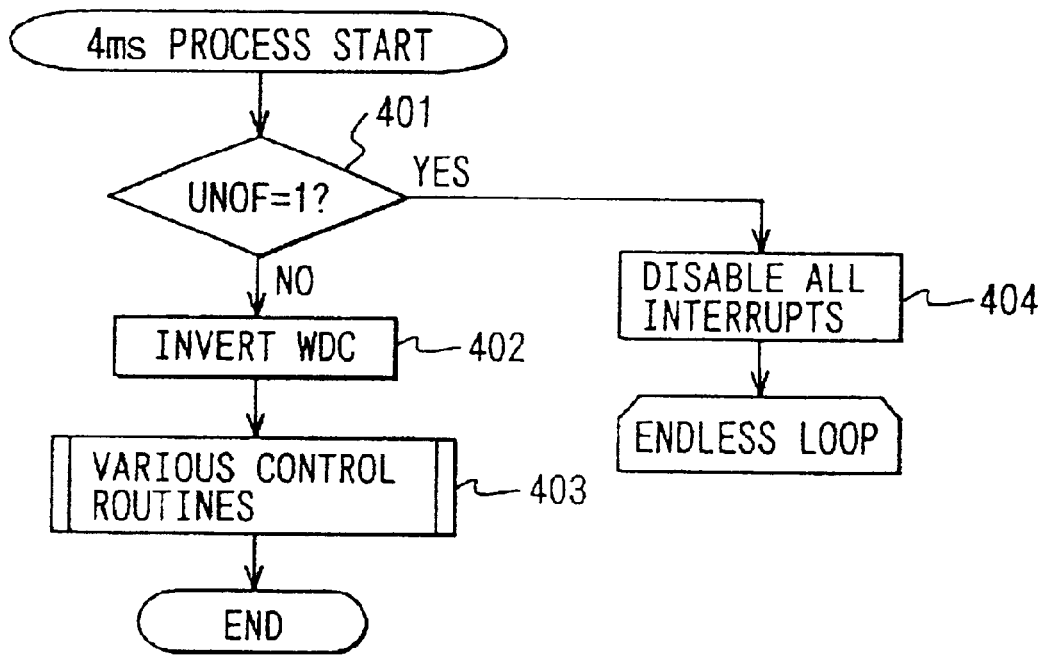
FIG. 7 is a flow diagram showing a 4 ms processing executed in the first embodiment.

In 4 ms routine shown in FIG. 7, the result of non-numeric check performed in the idle routine of FIG. 6 is monitored.

That is, at step 401 of FIG. 7, whether the non-numeric occurrence flag UNOF is 1 is checked. If the non-numeric occurrence flag UNOF is 0 indicating that there is no non-numeric, control proceeds to step 402, where a WDC signal is inverted. In such a case, since the WDC signal is inverted at a cycle of 4 ms, the WDC monitoring circuit 18 can be notified that the CPU 12 is normally operating. At the next step 403, various control operations performed at a cycle of 4 ms, such as A/D conversion of various sensor detection values, are performed, and then this routine terminates temporarily.

If the non-numeric occurrence flag UNOF is 1 indicating that non-numeric exists, control proceeds to step 404. At step 404, all interrupts are disabled, and then control enters an endless loop. That is, since the entrance to the endless loop disables subsequent inversion of the WDC signal, the periodicity of the WDC signal is lost and a reset signal is produced to the microcomputer 11 from the WDC monitoring circuit 18 after a predetermined period of time (32 ms). Therefore, in the initial routine (processing of FIG. 4) of the microcomputer 11 executed upon input of the reset signal, the non-numeric occurrence flag UNOF is checked again and the non-numeric is purged.

In the routine of FIG. 7, when non-numeric exists, all interrupts are disabled and control enters an endless loop. As a result, it can be avoided that the non-numeric in the period after the existence of the non-numeric causes an adverse effect on various control calculations and operations is checked and before a reset signal is issued. That is, although, after the existence of non-numeric is determined, if interrupts are enabled, the non-numeric may be used in processing for a generated interrupt so that control may become abnormal, the processing shown in FIG. 7 prevents such a trouble.

According to the first embodiment having described, the following effects are obtained.

(1) The existence of non-numeric in the floating-point RAM area is checked, and when the existence of non-numeric is determined, the non-numeric is eliminated by initializing RAM data. Therefore, various troubles attributed to the existence of data including non-numeric in control operations by the microcomputer can be avoided. As a result, control failures due to the occurrence of non-numeric can be prevented.

(2) Since the floating-point RAM area is initialized by writing default values ineffective to control as RAM data, various control operations can be performed using the default values.

(3) In system initialization processing (initial routine) performed when the microcomputer 11 is switched on for operation, it is checked whether non-numeric exists in the floating-point RAM area of RAM 13. In this case, even if floating-point data in the RAM 13 is destroyed due to noise or for other reasons when the microcomputer 11 is inoperative, and non-numeric exists, an adverse effect on control is prevented immediately after the switch-on, that is, before control is started.

(4) Since non-numeric checking is performed at idle time in various control operations during normal operation of the microcomputer 11, even when high volumes of floating-point data exist and it takes much time to perform the non-numeric checking, no adverse influence is caused on the control operations. That is, the control operations can be carried out based on programmed routines. This configuration is also effective in terms of calculation load on the microcomputer 11.

(5) When the existence of non-numeric is determined, since the inversion operations of a WDC signal are discontinued, the microcomputer 11 is reset and the non-numeric can be eliminated by initialization processing associated with the reset operation.

(6) When the existence of non-numeric is determined, since all interrupts are disabled and control enters an endless loop, controllability is not lessened due to the non-numeric in the period from the time the existence of the non-numeric is determined and until the non-numeric is eliminated.

Second Embodiment

Figure 8:
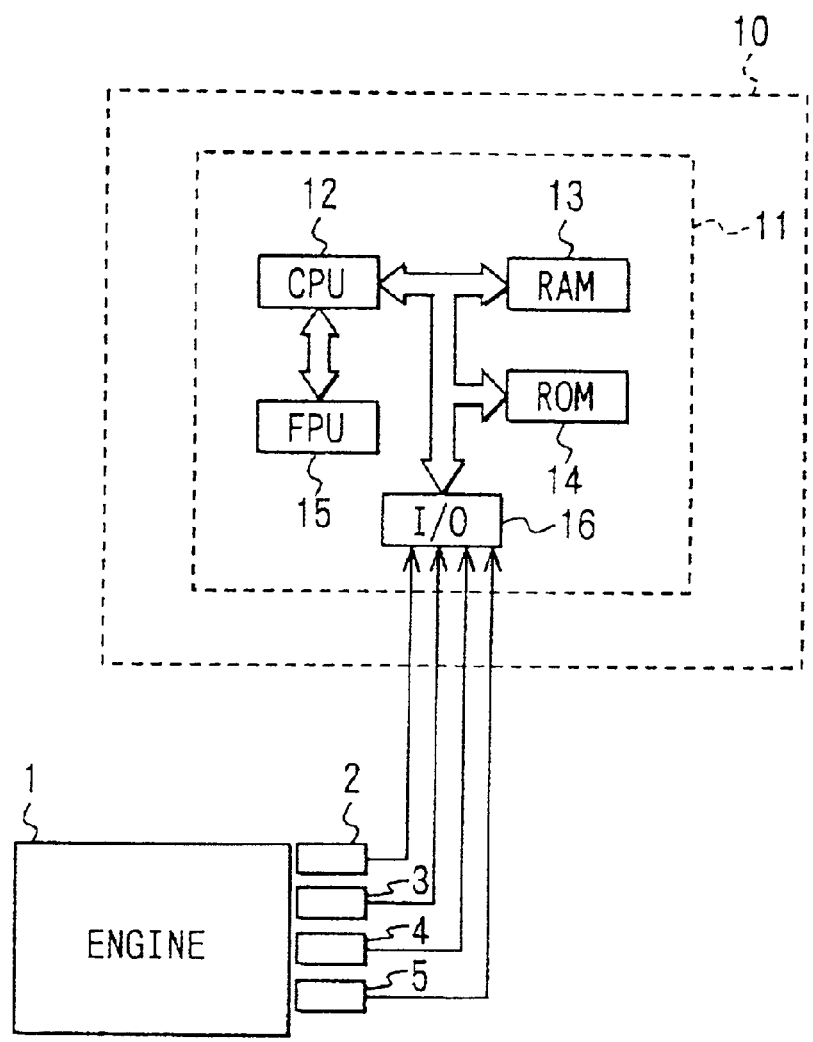
FIG. 8 is a block diagram showing an engine control system using an electronic control unit according to a second embodiment of the present invention.

In a second embodiment shown in FIG. 8, the ECU 10 is constructed similar to the first embodiment. It is however programmed so that, if the result of a floating-point calculation by FPU 15 becomes non-numeric, no floating-point calculation is performed. To be more specific, floating-point calculations by use of FPU 15 are performed to calculate a fuel injection amount and an ignition timing, and for example, a fuel injection amount f is calculated by the following expression.

$$f = Fbase \times fHL$$

Herein, Fbase is a basic fuel injection amount calculated as integer data and fHL is a load compensation value calculated as floating-point data. Accordingly, during calculation of a fuel injection amount f by use of FPU 15, if the load compensation value fHL is non-numeric, the calculation result (the value of fuel injection amount f) also becomes non-numeric. For this reason, in this embodiment, if the load compensation value fHL is non-numeric, the calculation of the fuel injection amount f by use of FPU 15 is inhibited, and alternatively, backup processing is performed by the CPU 12 in calculating the fuel injection amount f.

Of processing performed by the CPU 12, processing for calculating a load compensation value fHL is described with reference to FIG. 9 and fuel injection amount calculation processing is described with reference to FIG. 10. Processing of FIG. 9 is a time-synchronized routine performed every specified time, and processing of FIG. 10 is a crankshaft rotation angle-synchronized routine performed every specified crankshaft angle, that is, every pulse signal from the engine speed sensor.

As shown in FIG. 9, the CPU 12 determines at step 2100 whether the engine speed Ne is 3000 rpm or more. If it is 3000 rpm or more, the process advances to step 2110. At step 2110, the CPU 12 checks whether the engine coolant temperature Thw is 60° C. or higher. If it is 60° C. or higher, the process advances to step 2120. At step 2120, the load compensation value fHL is calculated based on the following expression, using the FPU 15.

$$fHL = fNe \times MAF \times fGain$$

Herein, fNe is an engine speed calculated as floating-point data based on the pulse signal of the engine speed sensor, and MAF is a value detected by an intake pressure sensor and a voltage value of integer data based on intake pipe pressure (intake pressure). fGain is a constant of floating-point data.

In this way, if the condition that the engine speed Ne is 3000 rpm or more and the coolant temperature Thw is 60° C. or higher is satisfied as a precondition for load compensation value calculation, the floating-point calculation by the FPU 15 is performed and the load compensation value fHL of floating-point data is calculated.

On the other hand, if the engine speed Ne is less than 3000 rpm or the coolant temperature Thw is less than 60° C., negative determination is made at step 2100 or 2110. At step 2130, the CPU 12 sets the load compensation value fHL to a fixed value 1.0 of floating-point data.

Next, fuel injection amount calculation routine is described with reference to FIG. 10. First, at step 2200, the CPU 12 calculates the basic fuel injection amount Fbase of integer data, based on the engine speed Ne and the intake pressure MAF. At the next step 2210, it checks whether the load compensation value fHL is the non-numeric. That is, as the load compensation value fHL is already obtained as floating-point data, the CPU 12 checks whether bits 30 to 23 of the load compensation amount fHL are 11111111 and one of bits 22 to 0 of the load compensation value fHL is 1. If negative determination is made at step 2210, the CPU 12 advances its processing to step 2220 and calculates the fuel injection amount f by the following floating-point calculation, using the FPU 15.

$$f = Fbase \times fHL$$

That is, the fuel injection amount f is calculated by multiplying the basic fuel injection amount Fbase by the load compensation value fHL. The value of fuel injection amount f is calculated as floating-point data. Thereafter, at step 2230, the CPU 12 checks whether the calculated value is non-numeric. Upon determining that the calculated value is not non-numeric, the CPU 12 determines that the value of fuel injection amount f obtained by the floating-point calculation is correct, and terminates the routine.

On the other hand, if positive determination is made at step 2210 or 2230, the CPU 12 advances its process to step 2240 to set a fuel injection amount f to the basic fuel injection amount Fbase of integer data without using the FPU 15, and then terminates the routine.

Figure 11:
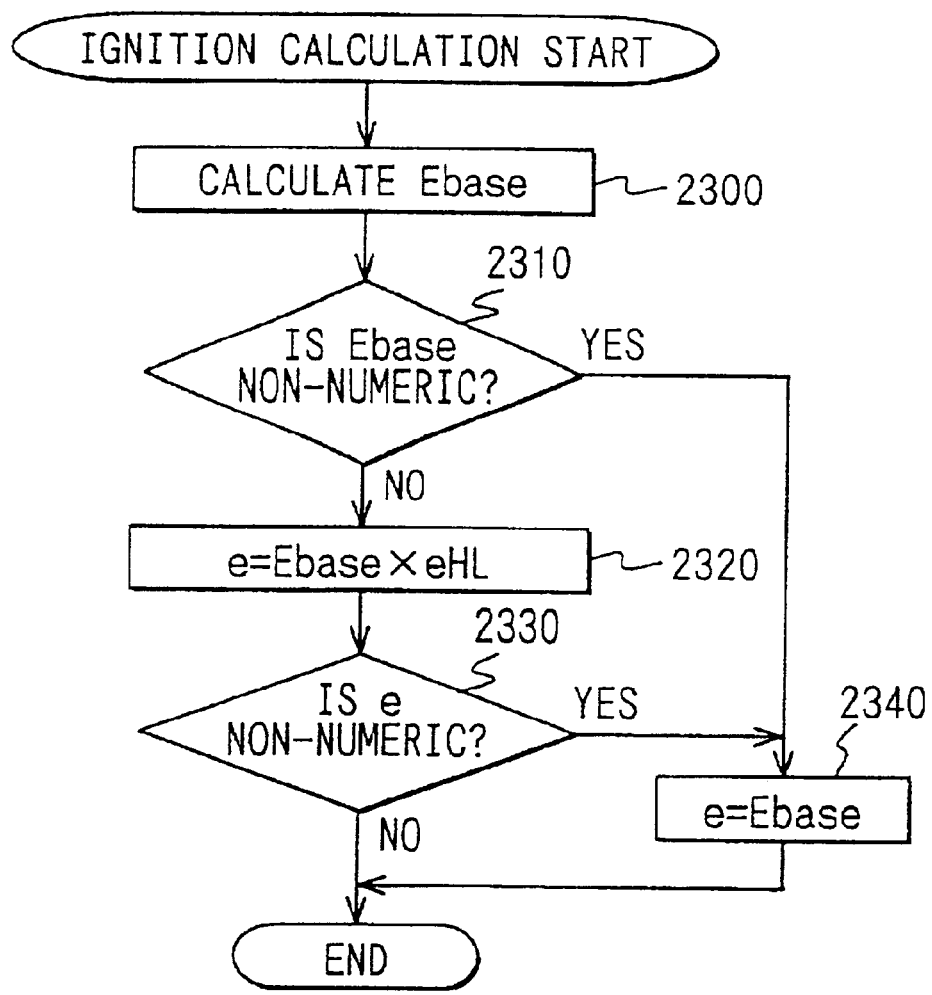
FIG. 11 is a flow diagram showing an ignition timing calculation routine executed in the second embodiment.

Next, processing for calculating ignition timing e is described with reference to FIG. 11. A load compensation value eHL used in the processing is also a floating-point data obtained by a floating-point calculation, like the load compensation value fHL.

First, at step 2300, the CPU 12 calculates a basic ignition timing Ebase of integer data, based on the engine speed Ne and the intake pressure MAF. At the next step 2310, it checks whether the load compensation value eHL is non-numeric. If negative determination is made at step 2310, the CPU 12 advances its process to step 2320 to calculate the ignition timing e by the following floating-point calculation, using the FPU 15.

$$e = Ebase \times eHL$$

That is, the ignition timing e is calculated by multiplying the basic ignition timing Ebase by the load compensation value eHL. The value of ignition timing e is calculated as floating-point data. Thereafter, at step 2330, the CPU 12 checks whether the calculated value is non-numeric. Upon determining that the calculated value is not non-numeric, the CPU 12 determines that the value of ignition timing e obtained by the floating-point calculation is correct, and terminates the routine.

On the other hand, if positive determination is made at step 2310 or 2330, the CPU 12 advances its process to step 2340 to set the ignition timing e to the basic ignition timing Ebase of integer data without using the FPU 15, and then terminates the routine.

According to the second embodiment described above, the following effects are obtained.

(1) Where floating-point data (load compensation values fHL and eHL) used in a floating-point calculation is non-numeric, backup processing is performed so that engine control values such as fuel injection amount and ignition timing are calculated without floating-point calculation. In this case, the result of an arithmetic calculation including non-numeric in a floating-point calculation is non-numeric and is invalid. Therefore, when the floating-point data used in the floating-point calculation is non-numeric, the floating-point calculation that would produce an invalid value is inhibited. In this way, the fuel injection amount f and the ignition timing e as the engine control data can be prevented from becoming non-numeric, so that control failures due to the occurrence of non-numeric can be prevented.

(2) As the backup processing at the occurrence of non-numeric, the basic fuel injection amount Fbase of integer data is used as the final fuel injection amount f and the basic ignition timing Ebase of integer data is used as the final ignition timing e. That is, only calculated values harmless to control as backup values of control data are used. This helps to prevent a ROM capacity from increasing because of backup processing.

Third Embodiment

Figure 12:
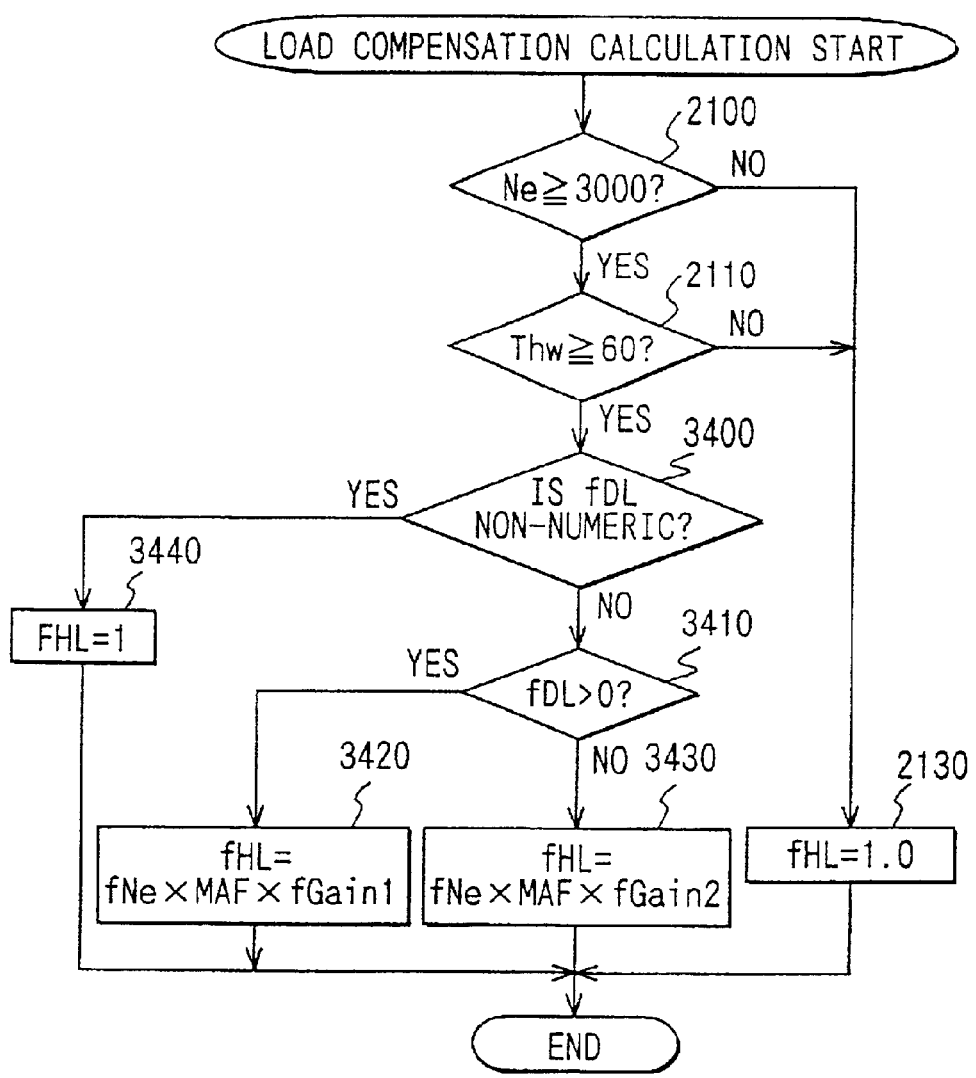
FIG. 12 is a flow diagram showing a load compensation value calculation routine executed in a third embodiment of the present invention.
Figure 13:
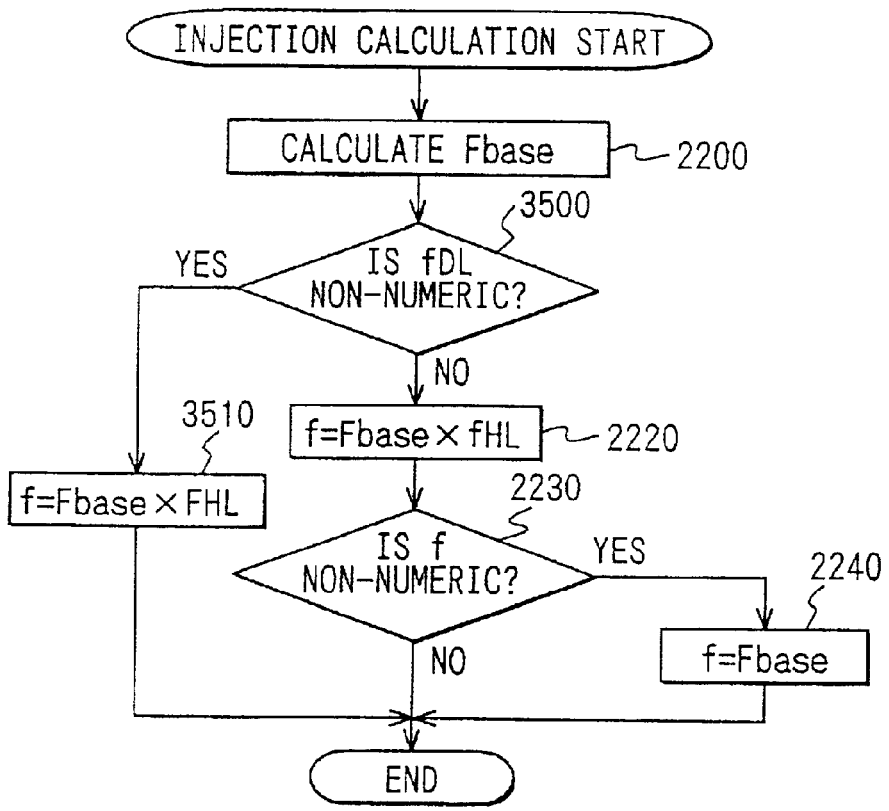
FIG. 13 is a flow diagram showing a fuel injection amount calculation routine executed in the third embodiment.

In a third embodiment shown in FIGS. 12 and 13, it is checked whether floating-point data to affect a calculation instead of floating-point data used in the calculation is non-numeric. In the third embodiment, the load compensation value fHL is calculated by different calculation expressions for acceleration and deceleration, and the determination of acceleration or deceleration is made by a parameter fDL corresponding to a load change amount. The parameter fDL, which is floating-point data calculated based on the engine speed Ne and the intake pressure MAF, denotes acceleration if it has a positive value, and deceleration if it has a negative value.

Processing for calculating the load compensation value fHL in this embodiment is described with reference to FIG. 12. The routine of FIG. 12 is slightly different from that of FIG. 9. That is, steps 2100, 2110 and 2130 of FIG. 12 perform the same processing as those of FIG. 9. That is, if the engine speed Ne is less than 3000 rpm or the coolant temperature Thw is less than 60° C. (when negative determination is made at step 2100 or 2110), the CPU 12 assigns 1.0 of floating-point data, as a fixed value, to a load compensation value fHL at step 2130, and then terminates the routine.

On the other hand, if the engine speed Ne is 3000 rpm or more and the coolant temperature Thw is 60° C. or higher, the CPU 12 checks at step 3400 whether the parameter fDL is non-numeric. If it is determined that the parameter fDL is not non-numeric, the CPU 12 advances its process to step 3410 to determine acceleration or deceleration, using the parameter fDL. If the parameter fDL is greater than 0, the CPU 12 advances to step 3420 to calculate a load compensation value fHL of floating-point data by performing an acceleration-time floating-point calculation (fNe×MAF× fGain1) using the FPU 15, and then terminates the routine. If the parameter fDL is equal to or smaller than 0, the CPU 12 advances its process to step 3430 to calculate a load compensation value fHL of floating-point data by performing a deceleration-time floating-point calculation (fNe× MAF×fGain2) using the FPU 15, and then terminates the routine. fGain1 is an acceleration compensation constant set by floating-point data and fGain2 is a deceleration compensation constant set by floating-point data.

On the other hand, if it is determined at step 3400 that the parameter fDL is non-numeric, the CPU 12 advances its process to step 3440 to assign a fixed value 1 of integer data to the load compensation value FHL, and then terminates the routine. The load compensation value FHL of integer data is stored in a storage area allocated separately from that of the load compensation value fHL of floating-point data in the RAM 13.

Next, fuel injection amount calculation processing in the third embodiment is described with reference to FIG. 13. The routine of FIG. 13 is slightly different from that of FIG. 10. Steps 2200, 2220, 2230, and 2240 of FIG. 13 perform the same processing as those of FIG. 10.

After the basic fuel injection amount Fbase is calculated at step 2200, it is determined at step 3500 whether the parameter fDL corresponding to the load change amount is non-numeric. If it is determined that the parameter fDL is non-numeric, the CPU 12 calculates, at step 3510 without using the FPU 15, the fuel injection amount f (=Fbase×FHL) by multiplying the basic fuel injection amount Fbase by the load compensation value FHL to which the fixed value 1 of integer data is assigned.

On the other hand, if it is determined at step 3500 that the parameter fDL is not non-numeric, the CPU 12 calculates, at step 2220, a fuel injection amount f (=Fbase×fHL) by a floating-point calculation using the FPU 15. The CPU 12 checks at step 2230 whether the calculated value is non-numeric, and terminates the routine if it is not non-numeric. If it is non-numeric, the CPU 12 assigns at step 2240 the basic fuel injection amount Fbase as the fuel injection amount f, and then terminates the routine.

That is, if the floating-point data to affect a floating-point calculation, that is, floating-point data used as a precondition for the floating-point calculation is non-numeric, there is the possibility that the precondition is not determined correctly and the floating-point calculation is performed erroneously. In contrast, in this embodiment, when it is determined that floating-point data used as a precondition is non-numeric, processing as substitution for a floating-point calculation is performed. This helps to prevent the trouble that the controllability of engine 1 is reduced because of incorrect control data obtained by erroneous execution of the floating-point calculation.

Fourth Embodiment

Figure 14:
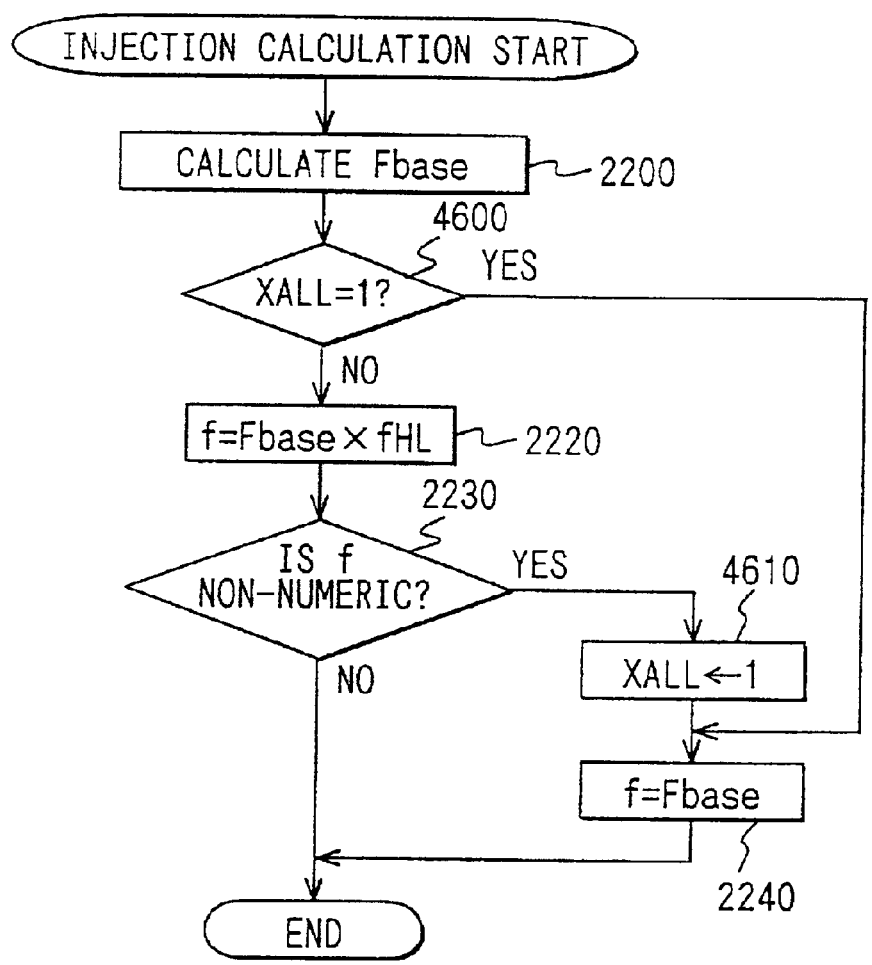
FIG. 14 is a flow diagram showing a fuel injection amount calculation routine executed in a fourth embodiment of the present invention.

In a fourth embodiment, when any one of all pieces of floating-point data is non-numeric, all floating-point calculations are inhibited and replaced by the backup processing. For instance, a routine for calculating the fuel injection amount f is executed as shown in FIG. 14. The routine of FIG. 14 is slightly different from that of FIG. 10. That is, steps 2200, 2220, 2230 and 2240 of FIG. 14 perform the same processing as those of FIG. 10.

In FIG. 14, non-numeric determination flag XALL is used and is set to 1 when any one of all pieces of floating-point data is non-numeric. For example, in floating-point calculations (not shown) for calculating load compensation value fHL, eHL, and the like, if a value calculated by the floating-point calculations is non-numeric, the non-numeric determination flag XALL is set to 1.

More specifically, after the basic fuel injection amount Fbase is calculated at step 2200, the CPU 12 advances its process to step 4600 to check whether the non-numeric determination flag XALL is 1. When it is determined at step 2230 that the calculated value is not non-numeric, the CPU 12 terminates the routine. When it is determined that it is non-numeric, the CPU 12 advances its process to step 4610 to set the non-numeric determination flag XALL to 1. Then, the CPU 12 advances to step 2240 to assign the basic fuel injection amount Fbase as a fuel injection amount f, and then terminates the routine.

Where the non-numeric determination flag XALL is set to 1, positive determination is made at step 4600, and the basic fuel injection amount Fbase is assigned as a fuel injection amount f, and then the routine is terminated. That is, if the non-numeric determination flag XALL is set to 1, the floating-point calculation at step 2220 is bypassed, and processing of step 2240 is performed as the backup processing instead of the floating-point calculation.

Next, processing for calculating an ignition timing e is described with reference to FIG. 15. This routine is slightly different from that of FIG. 11, and steps 2300, 2320, 2330 and 2340 of FIG. 15 perform the same processing as those of FIG. 11.

Figure 15:
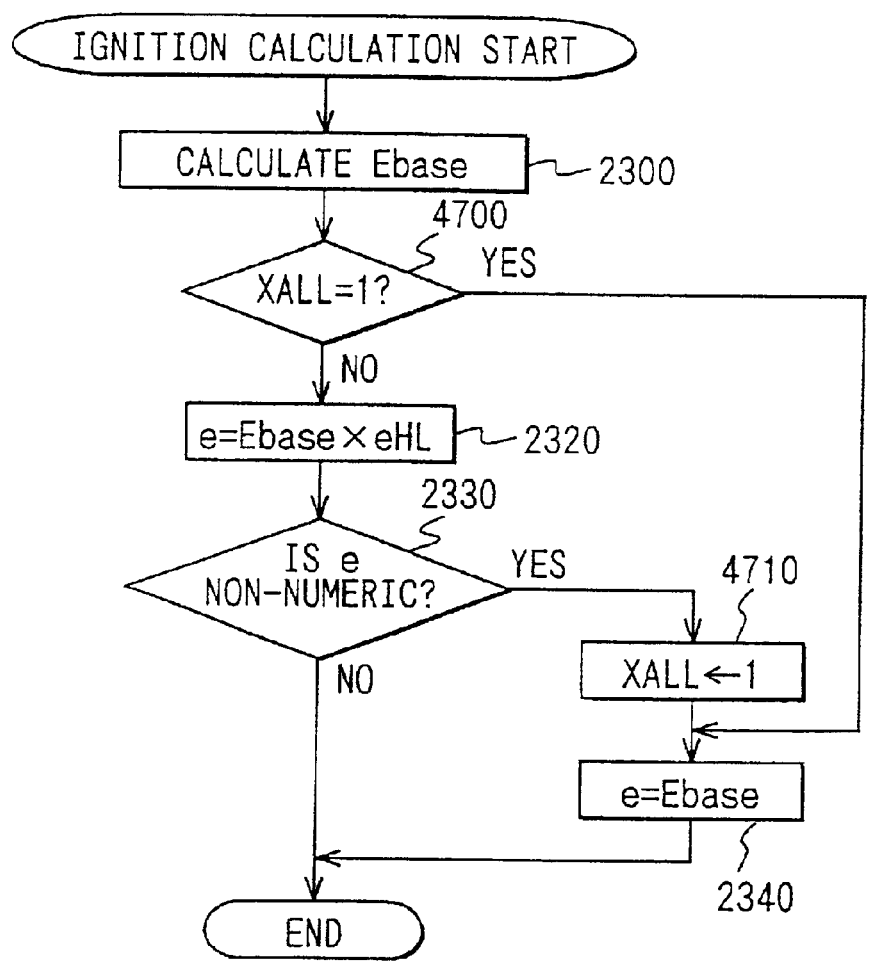
FIG. 15 is a flow diagram showing an ignition timing calculation routine executed in the fourth embodiment.

In the routine of FIG. 15, before performing a floating-point calculation of step 2320, it is determined at step 4700 whether the non-numeric determination flag XALL is 1. When it is determined that the non-numeric determination flag XALL is 1, the floating-point calculation of step 2320 is bypassed. As the backup processing instead of the floating-point calculation of step 2320, the basic ignition timing Ebase is assigned to the ignition timing e at step 2340. When it is determined that a value calculated by the floating-point calculation of step 2320 is non-numeric, the CPU 12 advances its process to step 4710 to set the non-numeric determination flag XALL to 1, and then performs processing of step 2340.

That is, in this embodiment, in all floating-point calculations used for engine control, when it is determined that the results of the calculations are non-numeric, the common non-numeric determination flag XALL is set. Before performing the floating-point calculations, it is checked whether the non-numeric determination flag XALL is set. If the flag XALL is thus set, all the floating-point calculations are inhibited, and the backup processing is performed instead.

Actually, if any one of all pieces of floating-point data is non-numeric, it can be determined that the microcomputer 11 is operating in an environment in which the cause of the occurrence (specifically, noise) exists. Accordingly, since non-numeric may occur at any time, all floating-point calculations are inhibited and backup processing is performed instead of the floating-point calculations.

In the fourth embodiment, the non-numeric determination flag XALL is used to check whether floating-point data is non-numeric simplifying processing and yielding practically desirable results in comparison with the case of determining whether the values of all pieces of floating-point data are non-numeric.

As described above, where non-numeric occurs in any one of pieces of floating-point data and the flag XALL is set consequently, when factors such as noise to cause the occurrence of non-numeric have been eliminated and the floating-point data has been restored to a normal value, the flag XALL may be reset to resume the previous floating-point calculations. This prevents continued backup processing when non-numeric temporarily occurs due to noise or for other reasons, enabling restoration to highly accurate floating-point calculations.

Fifth Embodiment

Figure 16:
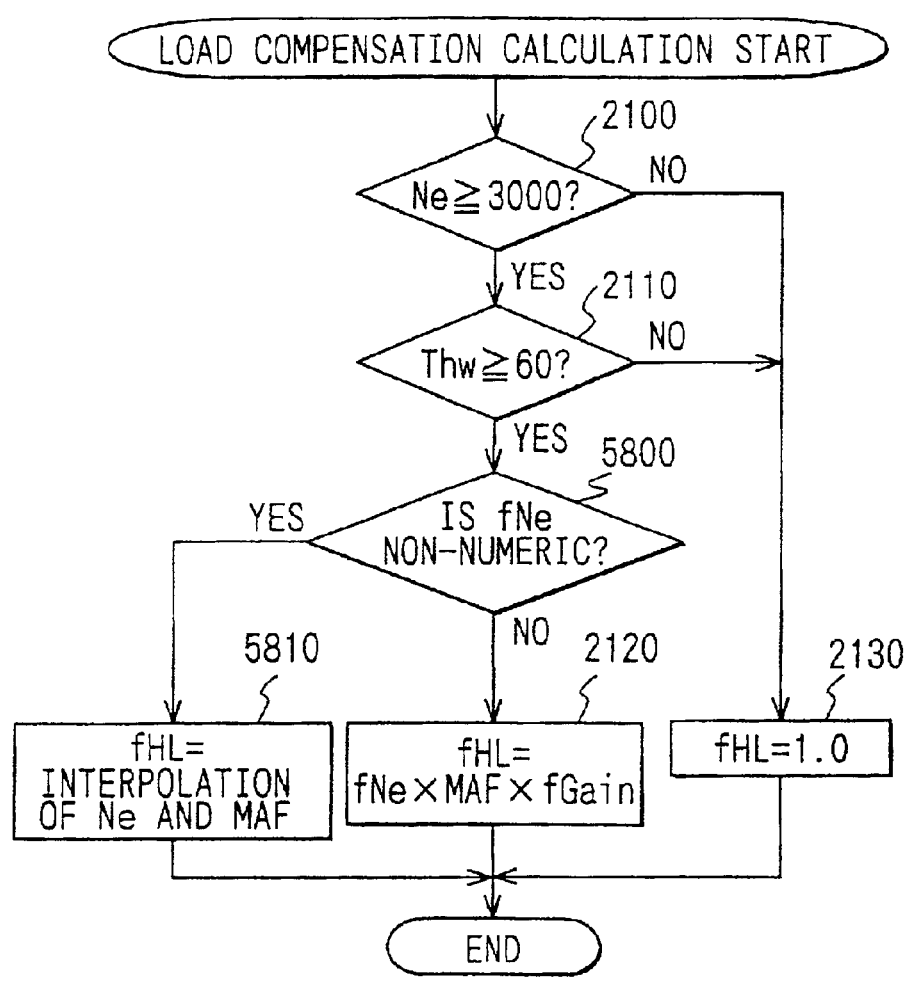
FIG. 16 is a flow diagram showing a load compensation value calculation routine executed in a fifth embodiment of the present invention.

In a fifth embodiment, the load compensation value calculation routine is differentiated as shown in FIG. 16 from that of FIG. 9. Steps 2100 to 2130 of FIG. 16 perform the same processing as those of FIG. 9. To be more specific, if the engine speed Ne is less than 3000 rpm or the coolant temperature Thw is less than 60° C. (when negative determination is made at step 2100 or 2110), the CPU 12 assigns 1.0 of floating-point data, as a fixed value, to a load compensation value fHL at step 2130.

If the engine speed Ne is 3000 rpm or more, and the coolant temperature Thw is 60° C. or higher (when positive determination is made in both steps 2100 and 2110), the CPU 12 proceeds to step 5800 to check whether the engine speed fNe calculated as floating-point data is non-numeric. When it is determined that the engine speed fNe is not non-numeric, the CPU 12 advances its process to step 2120 to calculate the load compensation value fHL=fNe×MAF× fGain of floating-point data by performing a floating-point calculation using the FPU 15, and then terminates the processing.

On the other hand, when it is determined that the engine speed fNe is non-numeric, the CPU 12 advances its process to step 5810 to interpolate, without using the FPU 15, map data with the engine speed Ne calculated as integer data and the intake pressure MAF of integer data as parameters. The CPU 12 converts the interpolated value obtained as integer data into floating-point data, assigns it to the load compensation value fHL, and terminates the processing.

In this way, in this embodiment, when it is determined that floating-point data is non-numeric, an operation using integer data is performed instead of a floating-point calculation. In this case, although the accuracy of calculation results is poorer than with a floating-point calculation, control data corresponding to integer data can be calculated as a backup value, yielding practically desirable results.

Modification

The above embodiments may be modified in many other ways.

For instance, in the first embodiment, the non-numeric check may be carried out by a hardware configuration of the microcomputer 1 in place of the software of FIG. 5. The reset operation may also be performed using a software routine by the microcomputer 11 in place of using the WDC monitoring circuit 18 during normal operation. Only data in the memories may be initialized in place of resetting the microcomputer 11, when it is determined that non-numeric exists.

In the second embodiment, a flag may also be used for the non-numeric checking in place of checking the value of the load compensation value fHL of floating-point data. That is, where a value calculated by the floating-point calculation at step 2120 of FIG. 9 is non-numeric, the non-numeric determination flag indicating that the load compensation value fHL is non-numeric is set, and it is checked at step 2210 of FIG. 10 whether the load compensation value fHL is non-numeric by checking the flag. In the same way, also in processing of step 2310 of FIG. 11 and step 3400 of FIG. 12, whether floating-point data is non-numeric may be checked using the non-numeric determination flag. In this case, by checking the non-numeric determination flag, it can be checked whether the floating-point data is non-numeric. Therefore, if the non-numeric determination flag is used in the case where the same floating-point data is used in multiple floating-point calculations, processing can be simplified, yielding practically desirable results.

In the third embodiment, where floating-point data such as an air-fuel ratio compensation amount is used as a precondition for performing the floating-point calculation, it may be checked whether the air-fuel ratio is non-numeric. If it is non-numeric, the floating-point calculation is inhibited and backup processing is performed instead of it.

For example, it is determined for each floating-point calculation whether floating-point data to affect the floating-point calculation is non-numeric. When non-numeric occurs, determination about non-numeric is determined separately for each of control calculations such as ignition control, injection control, and the like. Specifically, a common non-numeric determination flag is provided for each of control calculations such as ignition control, injection control, and the like. When non-numeric occurs in a floating-point calculation of, e.g., ignition control, non-numeric determination flag for ignition control is set. The non-numeric determination flag is used to inhibit all floating-point calculations performed in the ignition control. In this way, the occurrence of non-numeric does not influence on floating-point calculations.

In addition, the control value calculation may be effected by using only integer data when non-numeric is found to exist, and the floating-point data including the non-numeric may be initialized to default values after the predetermined calculation using the integer data has been completed or a predetermined time has elapsed.

Further, the above embodiments may also be modified to be implemented in electronic control units that handle floating-point data of double precision storage format in place of the single precision storage format. The embodiments may also be modified to other controls such as a vehicle travel control.

What is claimed is:

1. An electronic control unit comprising:

memory means for storing data;

operation means for performing various control operations based on a predetermined control program by using the data stored in the memory means, the control operations including a floating-point calculation in which a floating-point data is used;

non-numeric checking means for checking whether the floating-point data includes non-numeric; and backup means for performing backup processing in place of the floating-point calculation using the floating-point data including the non-numeric, when the non-numeric is determined by the non-numeric checking means;

wherein the non-numeric checking means performs non-numeric checking at idle time in the various control operations during normal operation of the operation means.

2. The electronic control unit as in claim 1, wherein:

the backup means includes data initializing means for initializing the data in the memory means when the existence of the non-numeric is determined by the non-numeric checking means.

3. The electronic control unit as in claim 2, wherein:

the data initializing means initializes the data in the memory means by writing into the memory means default values ineffective to control operations.

4. The electronic control unit as in claim 1, wherein:

the memory means is a non-volatile memory which maintains storing the data even when the operation means is in inoperative condition, and includes a storage area for storing the floating-point data; and the non-numeric checking means, in system initialization processing performed at the time of starting the operations of the operation means, performs non-numeric checking for the storage area storing the floating-point data.

5. The electronic control unit as in claim 1, further comprising:

resetting means for resetting the operation means when the existence of the non-numeric is determined by the non-numeric checking means during normal operation of the operation means.

6. The electronic control unit as in claim 1, further comprising:
a watchdog circuit for monitoring a watchdog clear signal periodically produced from the operation means and outputting a reset signal to the operation means each time the periodicity of inversion of the watchdog clear signal is lost,
wherein the operation means discontinues inversion of the watchdog clear signal when the existence of the non-numeric is determined by the non-numeric checking means.

7. The electronic control unit as in claim 1, wherein:
the backup means includes interrupt disabling means for disabling all interrupts when the existence of the non-numeric is determined by the non-numeric checking means.

8. The electronic control unit as in claim 1, wherein:
the backup means initializes only the data in the storage means without resetting the operation means.

9. The electronic control unit as in claim 1, wherein:
the operation means is programmed to control an internal combustion engine.

10. The electronic control unit as in claim 1, wherein:
the non-numeric checking means checks whether the floating-point data used in the floating-point calculation is non-numeric for each floating-point calculation.

11. The electronic control unit as in claim 1, wherein:
the non-numeric checking means checks whether the floating-point data to affect the calculation is non-numeric for each floating-point calculation.

12. The electronic control unit as in claim 1, wherein:
the non-numeric checking means checks whether any one of all pieces of the floating-point data is non-numeric.

13. The electronic control unit as in claim 1, wherein:
the operation means sets non-numeric determination flag each time it is determined that the floating-point data is non-numeric;
the non-numeric checking means checks the non-numeric determination flag for non-numeric; and
the backup means performs the backup processing based on a result of checking the non-numeric determination flag.

14. The electronic control unit as in claim 1, wherein:
the backup means uses an integer data as a backup value instead of the floating-point data.

15. The electronic control unit as in claim 1, wherein:
the backup means performs calculations using integer data instead of the floating-point calculations.

16. The electronic control unit as in claim 1, wherein:
the backup means performs calculations using integer data when the non-numeric is found to exist, and the floating-point data including the non-numeric is initialized to a default value after the calculation using the integer data has been completed or a predetermined time has elapsed.

17. An electronic control method for a vehicle comprising the steps of:
checking floating-point data for non-numeric, the floating-point data being for use in a calculation of a control value for the vehicle; and
disabling a use of the floating-point data including the non-numeric in the calculation of the control value, when a check result of the checking step indicates that the floating-point data includes the non-numeric.

18. The electronic control method as in claim 17, wherein:
the disabling step includes a step of initializing the floating-point data stored in a memory to a value which is ineffective to the calculation of the control value.

19. The electronic control method as in claim 17, wherein:
the checking step checks all floating-point data used and calculated in the course of calculation of the control value; and
the disabling step calculates the control value by replacing the floating-point data including the non-numeric with an integer value.

20. An electronic control unit comprising:
memory means for storing data;
operation means for performing various control operations based on a predetermined control program by using the data stored in the memory means, the control operations including a floating-point calculation in which a floating-point data is used;
non-numeric checking means for checking whether the floating-point data includes non-numeric; and
backup means for performing backup processing in place of the floating-point calculation using the floating-point data including the non-numeric, when the non-numeric is determined by the non-numeric checking means;
resetting means for resetting the operation means when the existence of the non-numeric is determined by the non-numeric checking means during normal operation of the operation means.

21. An electronic control unit as in claim 20 wherein:
the backup means includes data initializing means for initializing the data in the memory means when the existence of the non-numeric is determined by the non-numeric checking means.

22. An electronic control unit as in claim 21 wherein:
the data initializing means initializes the data in the memory means by writing into the memory means default values ineffective to control operations.

23. An electronic control circuit as in claim 20 wherein:
the memory means is a non-volatile memory which maintains storing the data even when the operation means is in inoperative condition, and includes a storage area for storing the floating-point data; and
the non-numeric checking means, in system initialization processing performed at the time of starting the operations of the operation means, performs non-numeric checking for the storage area storing the floating-point data.

24. An electronic control circuit as in claim 20 wherein:
the non-numeric checking means performs non-numeric checking at idle time in the various control operations during normal operations of the operation means.

25. An electronic control circuit as in claim 20 further comprising:
a watchdog circuit for monitoring a watchdog clear signal periodically produced from the operation means and outputting a reset signal to the operation means each time the periodicity of inversion of the watchdog clear signal is lost,
wherein the operation means discontinues inversion of the watchdog clear signal when the existence of the non-numeric is determined by the non-numeric checking means.

26. An electronic control unit comprising:
memory means for storing data;

operation means for performing various control operations based on a predetermined control program by using the data stored in the memory means, the control operations including a floating-point calculation in which a floating-point data is used;

non-numeric checking means for checking whether the floating-point data includes non-numeric; and backup means for performing backup processing in place of the floating-point calculation using the floating-point data including the non-numeric, when the non-numeric is determined by the non-numeric checking means;

a watchdog circuit for monitoring a watchdog clear signal periodically produced from the operation means and outputting a reset signal to the operation means each time the periodicity of inversion of the watchdog clear signal is lost, wherein the operation means discontinues inversion of the watchdog clear signal when the existence of the non-numeric is determined by the non-numeric checking means.

27. An electronic control unit comprising:

operation means for performing various control operations based on a predetermined control program, the control operations including a floating-point calculation in which a floating-point data stored in a memory means is used;

checking means for checking whether the memory means stores non-numeric data; and resetting means for resetting the operation means during normal operation of the operation means, when the checking means determines an existence of the non-numeric data in the memory means.

28. The electronic control unit as in claim 27, further comprising:

data initializing means for initializing data in the memory means before the operation means starts the normal operation, when the non-numeric checking means determines the existence of the non-numeric data in the memory means.

29. The electronic control unit as in claim 28, wherein:

the data initializing means initializes the data in the memory means by writing into the memory means default values ineffective to control operations.

30. The electronic control unit as in claim 28, wherein:

the memory means is a non-volatile memory which maintains storing the data even when the operation means is in inoperative condition, and includes a storage area for storing the floating-point data; and the non-numeric checking means, in system initialization processing performed before starting the control operations, performs non-numeric checking for the storage area storing the floating-point data.

31. The electronic control unit as in claim 27, wherein:

the non-numeric checking means performs non-numeric checking at idle time in the various control operations during the normal operations of the operation means.

32. A method for suppressing control failures in an electronic control unit caused by non-numeric floating point data, said method comprising:

storing data in a memory;

performing various control operations based on a predetermined control program by using the data stored in the memory, the control operations including a floating-point calculation in which floating-point data is used;

checking whether the floating-point data includes a non-numeric value; and performing backup processing in place of the floating-point calculation using the floating-point data including the non-numeric value, when the non-numeric value is determined by the non-numeric checking step, wherein said checking step performs non-numeric checking at idle time in the various control operations during normal control operation.

33. A method for suppressing control failures in an electronic control unit caused by non-numeric floating point data, said method comprising:

storing data in a memory;

performing various control operations based on a predetermined control program by using the data stored in the memory, the control operations including a floating-point calculation in which floating-point data is used;

checking whether the floating-point data includes a non-numeric value; and performing backup processing in place of the floating-point calculation using the floating-point data including the non-numeric value, when the non-numeric value is determined by the non-numeric checking step, wherein said checking step performs non-numeric checking at idle time in the various control operations during normal control operation, and resetting the control operations when the existence of non-numeric is determined by the non-numeric checking during normal control operations.

34. A method for suppressing control failures in an electronic control unit caused by non-numeric floating point data, said method comprising:

storing data in a memory;

performing various control operations based on a predetermined control program by using the data stored in the memory, the control operations including a floating-point calculation in which floating-point data is used;

checking whether the floating-point data includes a non-numeric value; and performing backup processing in place of the floating-point calculation using the floating-point data including the non-numeric value, when the non-numeric value is determined by the non-numeric checking step, wherein said checking step performs non-numeric checking at idle time in the various control operations during normal control operation, monitoring a watchdog clear signal periodically produced from the control operations and resetting the control operations each time the periodicity of inversion of the watchdog clear signal is lost, discontinuing inversion of the watchdog clear signal when the existence of the non-numeric is determined by the non-numeric checking step.

35. A method for suppressing control failures in an electronic control unit caused by non-numeric floating point data, said method comprising:

performing various control operations based on a predetermined control program, the control operations including a floating-point calculation in which floating-point data stored in a memory is used;

checking whether the memory stores non-numeric data; and resetting the control operations during normal operations when the checking step determines an existence of non-numeric data in the memory.

36. A method as in claim 35 further comprising:

initializing data in the memory before starting normal control operations when the non-numeric checking step determines the existence of non-numeric data in the memory.

37. A method as in claim 36 wherein:

the initializing data step initializes data in the memory by writing into the memory default values ineffective to control operations.

38. A method as in claim 36 wherein:

the memory is a non-volatile memory which maintains stored data even when the control operations step is in an inoperative condition, and includes a storage area for storing the floating-point data; and the non-numeric checking step, in initialization processing performed before starting the control operations, performs non-numeric checking for the storage area storing floating-point data.

39. A method as in claim 35 wherein:

the non-numeric checking step performs non-numeric checking at idle time in the various control operations during the normal control operations.

* * * * *